United States Patent [19]
McKinney et al.

[11] 3,875,038
[45] Apr. 1, 1975

[54] ELECTROLYTIC MACHINING APPARATUS

[75] Inventors: Lloyd J. McKinney, Lebanon, Ohio; Wayne W. Ferrin, Greenfield, Wis.

[73] Assignee: General Electric Company, Cincinnati, Ohio

[22] Filed: Sept. 26, 1973

[21] Appl. No.: 400,925

Related U.S. Application Data

[62] Division of Ser. No. 245,375, April 19, 1972, Pat. No. 3,795,604.

[52] U.S. Cl............ 204/224 M, 204/228, 204/284, 204/290 R
[51] Int. Cl............................ B23p 1/04, B01k 3/00
[58] Field of Search.... 204/224 M, 228, 284, 290 R

[56] References Cited
UNITED STATES PATENTS
3,723,268  3/1973  Johns et al...................... 204/228 X FOREIGN PATENTS OR APPLICATIONS
38-11262  7/1963  Japan............................ 204/224 M
45-18206  6/1970  Japan............................ 204/224 M Primary Examiner—John H. Mack
Assistant Examiner—D. R. Valentine
Attorney, Agent, or Firm—Derek P. Lawrence; Lee H. Sachs

[57] ABSTRACT

An improved electrode having dual mode capability for use in electrolytic machining, particularly small holes, comprises a dielectric electrolyte guide member having a hollow interior adapted to receive and to discharge electrolyte toward a conductive workpiece. Within the hollow interior is a first electrode and carried by the guide member outwardly of its dielectric wall is a second electrode, conveniently shaped as a collar, and having a tool surface facing the workpiece.

Apparatus adapted for electrolytic machining using such a cathode-tool includes means to supply to the first electrode electric current at a first potential sufficient to create in the electrolyte directed from the guide member a condition at least of incipient glow, and means to supply to the second electrode electric current at a second potential less than the first potential to provide electrolytic machining in the normal electrolysis range below incipient glow.

3 Claims, 3 Drawing Figures

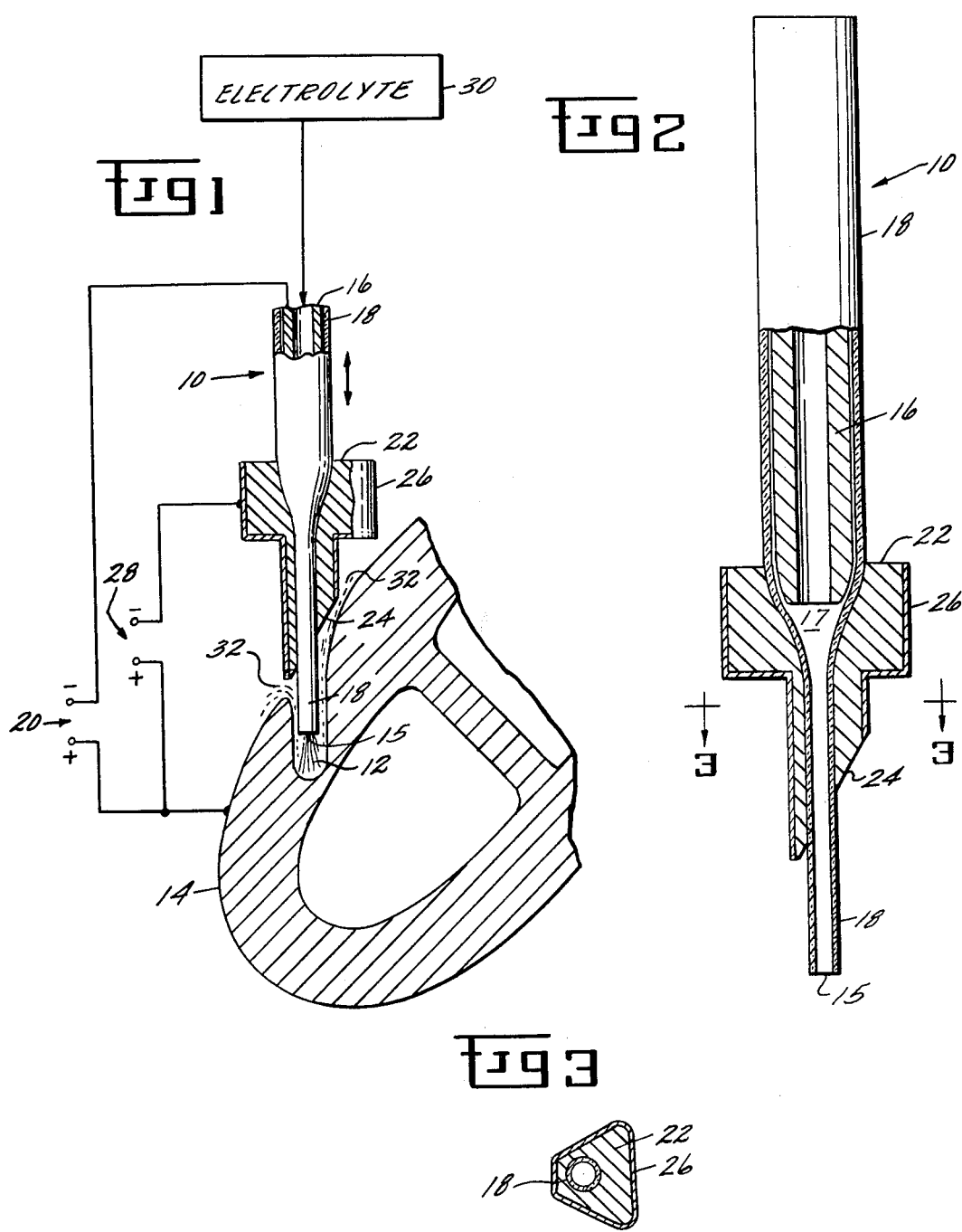

ELECTROLYTIC MACHINING APPARATUS

This is a divisional application of application Ser. No. 245,375 filed Apr. 19, 1972, now U.S. Pat. No. 3,795,604, and assigned to the assignee of the present invention.

BACKGROUND OF THE INVENTION

This invention relates to electrochemical material removal and, more particularly, to a dual mode tool and apparatus for cavity or hole generation.

In the gas turbine art, it has become increasingly more important to provide the flow of cooling fluid through the interior of some of the higher temperature operating components such as turbine blades. In some cases, it is desirable to discharge such cooling fluid through walls of the component. In order to control the character of such discharge flow, it has, in some cases, become desirable to provide an enlarged diffuser mouth or tapered section at the discharge surface.

Various methods for providing such countersunk type openings in the difficult-to-work high temperature superalloys used in manufacture of gas turbine blades had included the steps of first casting the tapered section into the part and then drilling the smaller hole into the part's hollow interior such as through electrochemical machining. Another method has involved the two-step process of first providing a hole by electrolytic drilling followed by a separate electrochemical machining of the diffuser section in a second operation. Both of these methods are undesirable from several standpoints. One is that it is difficult to achieve, in two separate operations, proper alignment between the hole and the diffuser section. Secondly, because at least two operations are involved, the cost of providing such openings is significantly increased.

SUMMARY OF THE INVENTION

It is a principal object of the present invention to provide an improved electrolytic machining electrode which will have dual mode capability for electrolytically drilling a cavity or hole as well as providing a countersunk mouth portion in a single operation.

Another object is to provide such an electrode which will be capable of the electrolytic generation of a cavity using a stream of cathodically charged electrolyte in a condition at least of incipient glow and be capable of generating a diffuser or tapered mouth by ordinary electrochemical machining in the normal electrolysis range.

These and other objects and advantages will be more clearly understood from the following detailed description, the examples and the drawing, all of which are intended to be typical of rather than limiting on the scope of the present invention.

Briefly, the present invention, in one form, provides an improved cathode-tool for use in apparatus for removing material electrolytically from a conductive workpiece. The apparatus includes means to supply electrical power, an electrolyte supply and means to hold the cathode-tool in opposed relationship with the workpiece. The cathode-tool comprises an electrolyte guide member having dielectric walls defining a hollow interior adapted to receive electrolyte. The guide member terminates in an electrolyte discharge port which directs electrolyte in the stream toward the workpiece. Within the hollow interior is a first electrode. Carried by the guide member outwardly of the dielectric walls is a second electrode which has a tool surface facing the workpiece and preferably is coated on other outward surfaces with a dielectric material. Associated with the first electrode is a means to supply electric current at a first potential sufficient to create in the stream of electrolyte directed toward the workpiece a condition at least of incipient glow. Associated with the second electrode is a means to supply electric current at a second potential less than the first potential and less than that sufficient to create in electrolyte associated with the second electrode a condition at least of incipient glow so that the second electrode operates in the normal electrolysis range.

BRIEF DESCRIPTION OF THE DRAWING

FIG. 1 is a fragmentary, partially sectional, partially diagrammatic view of the cathode-tool of the present invention in operation;

FIG. 2 is a partially sectional, enlarged view of the cathode-tool of FIG. 1; and FIG. 3 is a sectional view taken on line 3—3 of FIG. 2.

DESCRIPTION OF THE PREFERRED EMBODIMENTS

The dual mode operation of the cathode-tool of the present invention, shown generally at 10 in the drawing, involves the direction of a stream of electrolyte 12 in FIG. 1, charged cathodically with respect to workpiece 14 from electrolyte discharge port 15 in FIG. 2 toward and into contact with such workpiece. Impressed between workpiece 14 and first electrode 16, within hollow interior 17 of electrolyte guide member 18, is a first electric potential generated from first electric power source shown generally at 20. Such first potential is sufficient to create in the electrolyte stream between first cathode 16 and workpiece 14 a condition at least of incipient glow.

Such condition is more fully described in U.S. Pat. No. 3,403,084 — Andrews, issued Sept. 24, 1968 and is discussed in related copending application, Ser. No. 245,374, filed concurrently with this application, and now U.S. Pat. No. 3,764,510, both assigned to the assignee of the present invention. The unusual condition which is thus created results in enhanced material removal over that which would normally be anticipated from Faraday's Law. In order to achieve such enhanced material removal, the condition in such electrolyte stream is adjusted through the application of relatively high voltage for electrolytic material removal to create a condition at least of incipient glow. Under such a condition, the current begins to decrease with increasing voltage rather than increase as is the case in normal electrolysis. This is reported by Kellogg in the Journal of Electrochemical Society 1950, 97, 133 – 142. Therefore, this transition region is sometimes referred to as the "Kellogg Region". The voltage required will vary depending upon the gap between the cathode and the workpiece. An electrical potential as low as 50 volts has been used successfully, although generally at least about 75 volts is required for practical application. More frequently, however, because of the distance between the cathodic first electrode 16 and the anodic workpiece 14, the potential impressed by first electric power source 20 is at least about 200 volts.

Because the stream of cathodically charged electrolyte 12 is in the unusual electrical condition at least of incipient glow, it is necessary that the walls of electrolyte guide member 18 contacting the electrolyte be electrically isolated from other components of the system. For convenience, the term "dielectric" is used herein to denote such electrical isolation. Such isolation is necessary from both the electrolyte stream as well as from the anodic workpiece which, as shown in the drawing, the guide member penetrates. This avoids premature dissipation of the electric charge in the electrolyte stream. Conveniently, the electrolyte guide member is made of glass.

Carried by and electrically isolated from guide member 18, outwardly of its walls, is a second electrode 22 shown in the drawing as a shaped metal collar surrounding guide member 18. The second electrode shown in more detail in FIG. 2 and in section in FIG. 3, includes a tool surface 24 positioned in opposed relationship with workpiece 14 and located on guide member 18 at a predetermined point at which it is desired to operate with workpiece 14. Second electrode 22 preferably includes a dielectric surface or coating 26, other than on tool surface 24, to avoid stray electrolytic action with the workpiece. Tool surface 24 is positioned so that it will electrolytically remove material from workpiece 14 in a desired contour, for example as shown in FIG. 3. This creates a diffuser mouth in the entrance of the hole which was created by the action of cathodically charged stream of electrolyte 12 on workpiece 14.

A second potential is impressed between electrode 22 and workpiece 14 by second electric power source shown generally at 28 in FIG. 1. Such second electric potential is less than the first electric potential impressed between first electrode 16 and anodic workpiece 14. Also, it is less than the potential which is sufficient to create in the electrolyte the condition at least of incipient glow discussed before. Therefore, electrolytic material removing action between second electrode 22 and the workpiece is in the normal electrolysis or electrochemical machining range. Conveniently, second electric power source 28 impresses a potential of less than 50 volts and generally less than 20 volts, for example about 6 – 8 volts, between cathodic second electrode 22 and anodic workpiece 14.

Electrolyte which supports the electrolytic machining action between second electrode 22 and the workpiece comes from the same electrolyte source 30 as that used to produce cathodic electrolyte stream 12. Initially stream 12, in the condition at least of incipient glow, contacts the workpiece and participates in the enhanced electrolytic material removal discussed above. Then it flows out of the cavity thus created to form electrolyte flow 32 between the workpiece and tool surface 24. When second electrolyte power source 28 impresses electric potential between second electrode 22 and workpiece 14 to make the second electrode cathodic with respect to the workpiece, normal electrolytic machining occurs between the second electrode and the workpiece as the second electrode approaches the workpiece.

Thus, there is created a contoured mouth or countersunk depression at the entrance of the hole created by charged electrolyte stream 12. Such hole and mouth both are created in a single operation and at a lower cost through the use of a cathode-tool of the present invention without repositioning of either the tool or the workpiece. This provides accurate alignment of the countersunk opening with the balance of the hole.

What is claimed is:

1. In apparatus for removing material electrolytically from a conductive workpiece, the apparatus including means to supply electrical power, an electrolyte supply and means holding a cathode-tool for opposed relationship with a workpiece;

the cathode-tool comprising:
 a. an electrolyte guide member having a wall defining a hollow interior adapted to receive electrolyte and terminating in an electrolyte discharge port which directs electrolyte in a stream toward the workpiece,
 b. a first electrode within the hollow interior,
 c. a second electrode carried by the guide member outwardly of the wall, the second electrode having a tool surface facing the workpiece,
 d. the wall of the electrolyte guide member being electrically isolated from both the first and second electrodes;

first means to supply to the first electrode electric current at a first potential sufficient to create in the electrolyte stream directed from the electrolyte discharge port toward and in contact with the workpiece a condition at least of incipient glow;

second means to supply to the second electrode electric current at a second potential less than the first potential and less than that sufficient to create in the electrolyte between the second electrode and the workpiece a condition at least of incipient glow;

the first and second electrodes being cathodic with respect to the workpiece.

2. The apparatus of claim 1 in which the first potential is at least 50 volts.

3. The apparatus of claim 1 in which the first potential is at least about 200 volts and the second potential is less than about 20 volts.

* * * * *